United States Patent
Krisko et al.

(10) Patent No.: US 10,731,403 B2
(45) Date of Patent: Aug. 4, 2020

(54) VACUUM INSULATED GLAZING UNIT

(71) Applicant: VKR Holding A/S, Hørsholm (DK)

(72) Inventors: Annette Johncock Krisko, Prarie du Sac, WI (US); Scott Thomsen, South Lyon, MI (US)

(73) Assignee: VKR HOLDING A/S, Hørsholm (DK)

( * ) Notice: Subject to any disclaimer, the term of this patent is extended or adjusted under 35 U.S.C. 154(b) by 62 days.

(21) Appl. No.: 16/152,775

(22) Filed: Oct. 5, 2018

(65) Prior Publication Data

US 2019/0106931 A1 Apr. 11, 2019

Related U.S. Application Data

(60) Provisional application No. 62/568,997, filed on Oct. 6, 2017.

(51) Int. Cl.
  *E06B 3/66* (2006.01)
  *E06B 3/663* (2006.01)
  (Continued)

(52) U.S. Cl.
  CPC ........ *E06B 3/6612* (2013.01); *C03C 23/0055* (2013.01); *C03C 27/06* (2013.01);
  (Continued)

(58) Field of Classification Search
  CPC ............... E06B 3/6612; E06B 3/66304; E06B 3/66326; E06B 3/6715; E06B 3/6775; Y02B 80/24; Y02A 30/25
  See application file for complete search history.

(56) References Cited

U.S. PATENT DOCUMENTS 5,711,782 A  1/1998 Okamura et al.
6,472,032 B1 * 10/2002 Asano ..................... C03C 8/245
                                          428/34
(Continued)

FOREIGN PATENT DOCUMENTS

AT          14327 U     8/2015
EP       1422204 A1     5/2004
(Continued)

OTHER PUBLICATIONS

Machine translation of applicant cited reference WO2012157520 (Year: 2012).*

(Continued)

*Primary Examiner* — Donald J Loney
(74) *Attorney, Agent, or Firm* — Cantor Colburn LLP

(57) ABSTRACT

A vacuum insulated glazing unit comprising a first glass pane and a second glass pane arranged in parallel, the second glass pane spaced apart from the first glass pane, wherein each glass pane comprises inner and outer surfaces, wherein the inner surfaces define a gap therebetween; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein at least a portion of the inner surface of the first glass pane comprises a strengthened portion that comprises a plurality of implanted ions, wherein the plurality of implanted ions are nitrogen ions, carbon ions, argon ions, or a combination comprising at least one of the foregoing.

11 Claims, 4 Drawing Sheets

(51) Int. Cl.
*E06B 3/673* (2006.01)
*C03C 27/06* (2006.01)
*E06B 3/67* (2006.01)
*C03C 23/00* (2006.01)
*C03C 27/10* (2006.01)
*E06B 3/677* (2006.01)
*C03C 27/00* (2006.01)

(52) U.S. Cl.
CPC .......... *C03C 27/10* (2013.01); *E06B 3/66304* (2013.01); *E06B 3/6715* (2013.01); *E06B 3/67326* (2013.01); *C03C 27/00* (2013.01); *E06B 3/6775* (2013.01); *E06B 2003/66338* (2013.01); *Y02A 30/25* (2018.01); *Y02B 80/24* (2013.01)

(56) References Cited

U.S. PATENT DOCUMENTS

| | | |
|---|---|---|
| 2003/0064198 A1 | 4/2003 | Thomsen et al. |
| 2004/0180216 A1 | 9/2004 | Veerasamy et al. |
| 2006/0008656 A1 | 1/2006 | Veerasamy |
| 2009/0324858 A1 | 12/2009 | Jaeger |
| 2013/0059087 A1 | 3/2013 | Veerasamy et al. |
| 2013/0059160 A1 | 3/2013 | Veerasamy et al. |
| 2013/0273377 A1 | 10/2013 | Veerasamy |
| 2015/0218877 A1 | 8/2015 | Kawahara et al. |

FOREIGN PATENT DOCUMENTS

| | | | | |
|---|---|---|---|---|
| GB | 2234968 A | * | 2/1991 | ........... C03C 23/007 |
| JP | 2007238378 A | | 9/2007 | |
| WO | 200227135 A1 | | 4/2002 | |
| WO | 2012157520 A1 | | 11/2012 | |
| WO | 2016027750 A1 | | 2/2016 | |
| WO | 2016144857 A1 | | 9/2016 | |
| WO | 2017019837 A1 | | 2/2017 | |
| WO | WO 2017019837 | | 2/2017 | |
| WO | 2017178168 A1 | | 10/2017 | |

OTHER PUBLICATIONS

EP Communication for EP Application No. 18 198 763.7-1005; Date Completed—Sep. 4, 2019; 4 pages.
European Communication for EP Application No. 18 198 772.8-1005; Date of Completion—Sep. 4, 2019; 4 pages.
Extended European Search Report; EP Application No. 18198763.7-1005, Date of Completion of Search—Nov. 15, 2018; 7 pages.
Extended European Search Report; EP Application No. 18198772.8-1005; Date of Completion of Search—Nov. 15, 2018; 7 pages.

* cited by examiner

VACUUM INSULATED GLAZING UNIT

CROSS REFERENCE TO RELATED APPLICATION

This application claims the benefit of and priority to U.S. Provisional Application No. 62/568,997, filed Oct. 6, 2017.

BACKGROUND

Vacuum-insulated glass (VIG) units typically include two or more glass panes, spaced by an array of pillars, and sealed at the periphery to provide an evacuated space (i.e., vacuum) located between the glass panes. The evacuated space is sealed at a reduced pressure such as 0.001 millibars or less in order to ensure an insulating effect of the VIG unit. The overall construction provides improved thermal and noise insulating properties compared to ordinary glass windows. To prevent sagging and contact between adjacent glass panes, the pillars can serve as discrete spacers between adjacent glass panes.

Internal spacers are effective in separating the panes. However, direct contact interactions between the spacer and the glass panes can be problematic during high impact events, such as hail storms. There is therefore a need for vacuum insulated glass units having glass panes that are resistant to adverse contact with the spacers.

BRIEF DESCRIPTION

According to an embodiment, a vacuum insulated glazing unit includes a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein at least a portion of the inner surface of the first glass pane comprises a strengthened portion that comprises a plurality of implanted ions.

According to another embodiment, a vacuum insulated glazing unit includes a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein at least a portion of the inner surface of the first glass pane comprises a strengthened portion that comprises a plurality of implanted ions, wherein the plurality of implanted ions are nitrogen ions, carbon ions, argon ions or a combination comprising at least one of the foregoing.

In another embodiment, a vacuum insulated glazing unit includes a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein the inner surface of the first glass pane comprises a strengthened portion that comprises a plurality of implanted ions.

In still another embodiment, a vacuum insulated glazing unit includes a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein the inner surfaces of the first glass pane and the second glass pane comprise a strengthened portion comprising a plurality of implanted ions.

In yet another embodiment, a vacuum insulated glazing unit includes a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween, and wherein the first glass pane and the second glass pane comprise tempered glass; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein at least a portion of the inner surface of the first glass pane comprises a strengthened portion that comprises a plurality of implanted ions.

In still yet another embodiment, a vacuum insulated glazing unit includes a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween, and wherein the inner surface of the first glass pane comprises a low-emittance coating; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein at least a portion of the inner surface of the first glass pane comprises a strengthened portion that comprises a plurality of implanted ions.

According to another aspect, in an embodiment a tempered glass pane for a vacuum insulated glazing unit is provided, the tempered glass pane comprising a first surface and a second surface, wherein the first surface comprises a low-emittance coating, and wherein at least a portion of the first surface comprises a strengthened portion that comprises a plurality of implanted ions.

In another embodiment, a tempered glass pane for a vacuum insulated glazing unit is provided, the tempered glass pane comprising a first surface and a second surface, wherein the first surface comprises a low-emittance coating, and wherein the first surface comprises a plurality of implanted ions.

In still another embodiment, a tempered glass pane for a vacuum insulated glazing unit is provided, the glass pane comprising a first surface and a second surface, wherein at least a portion of the first surface comprises a strengthened portion that comprises a plurality of implanted ions.

In an embodiment, a tempered glass pane for a vacuum insulated glazing unit is provided, the tempered glass pane comprising a first surface and a second surface, wherein the first surface comprises a low-emittance coating comprising a plurality of implanted ions According to another aspect, an embodiment provides a method for modifying a tempered glass pane for a vacuum insulated glazing unit, the method comprising implanting a plurality of ions into at least a portion of a first surface of the tempered glass pane to form a strengthened portion, wherein the strengthened portion comprises a plurality of nitrogen ions, carbon ions, argon ions, or a combination comprising at least one of the foregoing.

In another embodiment, a method for modifying a tempered glass pane for a vacuum insulated glazing unit is provided, the method comprises: forming a low-emittance coating on a first surface of the tempered glass pane; and implanting a plurality of ions into at least a portion of the first surface to form a strengthened portion, wherein the strengthened portion comprises a plurality of nitrogen ions, carbon ions, argon ions, or a combination comprising at least one of the foregoing.

In still another embodiment, a method for producing a vacuum insulated glazing unit is provided, the method comprising: implanting a plurality of ions into at least a portion of a first surface of a first glass pane to form a strengthened portion; and combining the first glass pane, a second glass pane, a plurality of spacers, and a side seal material to produce the vacuum insulated glazing unit.

In yet another embodiment, a method for producing a vacuum insulated glazing unit is provided, the method comprising: implanting a plurality of ions into at least a portion of a first surface of a first glass pane to form a strengthened portion, wherein the strengthened portion comprises a plurality of nitrogen ions, carbon ions, argon ions, or a combination of at least one of the foregoing; and combining the first glass pane, a second glass pane, a plurality of spacers, and a side seal material to produce the vacuum insulated glazing unit.

According to still another aspect, an embodiment provides a window comprising the vacuum insulated glazing unit, the glass pane, or prepared by the method disclosed herein.

According to another aspect, an embodiment provides use of the vacuum insulated glazing unit for a window.

An embodiment provides use of the glass pane and/or the tempered glass pane for a vacuum insulated glazing unit.

Another embodiment provides use of the window for a fixed or ventilating window of a commercial building.

Another embodiment provides use of the window for a fixed or ventilating window of a residential building.

Another embodiment provides use of the window for a roof window or a skylight window.

Another embodiment provides use of the window for a vertical window application.

The above described and other features are exemplified by the following figures and detailed description.

BRIEF DESCRIPTION OF THE DRAWINGS

The following figures are exemplary embodiments wherein the like elements are numbered alike.

FIG. 2b is a filtered version of the array of microscope photographs shown in FIG. 2a.

FIG. 3b is a filtered version of the array of microscope photographs shown in FIG. 3a.

FIG. 4a is a series of microscope photographs of glass panes after testing according to still another embodiment, for visually evaluating cracks in the glass panes.

FIG. 4b is a filtered version of the series of microscope photographs shown in FIG. 4a.

DETAILED DESCRIPTION

Figure 1A:
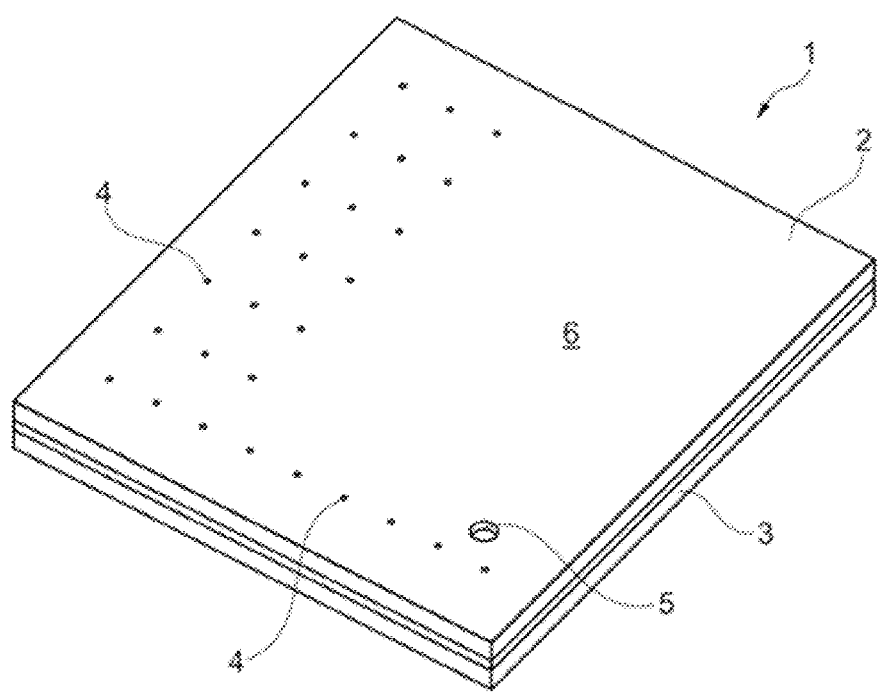
FIG. 1a is a perspective view of a vacuum insulated glazing unit according to an embodiment.

Exemplary embodiments will now be described more fully hereinafter with reference to the accompanying drawings. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary embodiments are described herein with reference to cross section illustrations that are schematic illustrations of idealized embodiments, wherein like reference numerals refer to like elements throughout the specification. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary embodiments of the present disclosure.

The present disclosure relates to a vacuum insulated glazing (VIG) unit and glass pane therefore. Furthermore, the present disclosure relates to a window comprising a vacuum insulated glazing (VIG) unit enclosed in a frame.

To enhance the energy performance of the VIG unit is has been found advantageous to increase the distance between the spacers. However, an increased spacing between the spacers can increase the load and stress on the glass panes at each spacer position. Also, to enhance the energy performance of the VIG unit is has been found advantageous to employ a low emittance (low-E) coating oriented towards the interior gap. The low-E coating may interface with the spacers. The thermal gradient, i.e. difference between interior and exterior, causes the glass panes of the VIG to move relative to one another and may cause the spacers to shear or slide. The VIG unit can also be subject to impact, such as by objects or hail, which the VIG unit must withstand without significant cracking. During production of the VIG unit, the temperature may be quite high to clean the unit or to form the seals. The high temperature, for example 200-500° C., can affect the properties of the glass panes. A VIG should maintain the low pressure for many years, however sustained or increasing stress can introduce micro cracks in the glass panes, which may slowly increase the pressure in the VIG unit. Moreover, air leaking into the VIG unit can cause other undesirable effects such as fogging or condensation.

It has been discovered by the present inventors that strengthened glass panes for the VIG unit is advantageous with regard to ameliorating the aforementioned issues. In particular, it has been discovered that implanted ions can be used to strengthen the glass panes, thereby reducing the deleterious interactions between the spacers and the glass panes.

The vacuum insulated glazing unit includes a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein at least a portion of the inner surface of the first glass pane comprises a strengthened portion that comprises a plurality of implanted ions.

Low gaseous thermal conduction may be achieved when, for example, the pressure in the gap is reduced to a level equal to or below about $10^{-5}$ bar, more preferably below $10^{-6}$ bar, and most preferably below $10^{-7}$ bar of atmospheric pressure. The side seal material forms a hermetic seal and substantially eliminates any ingress or outgress of gas or air to/from the gap.

FIG. 1a is a perspective view of an embodiment of vacuum insulated glazing (VIG) unit 1. The VIG unit includes a first glass pane 2 and a second glass pane 3 arranged in parallel. The inner surfaces of the first glass pane 2 and second glass pane 3 define a gap therebetween, and a plurality of spacers 4 are arranged in the gap between the inner surfaces. As shown in FIG. 1a, the locations of the plurality of spacers 4 are depicted and are visibly illustrated as being viewed through the outer surface 6 of the first glass pane 2. In some embodiments, a glass pane such as the first glass pane 2 can further include an evacuation hole 5 for applying a vacuum to the gap between the glass panes.

Figure 1B:
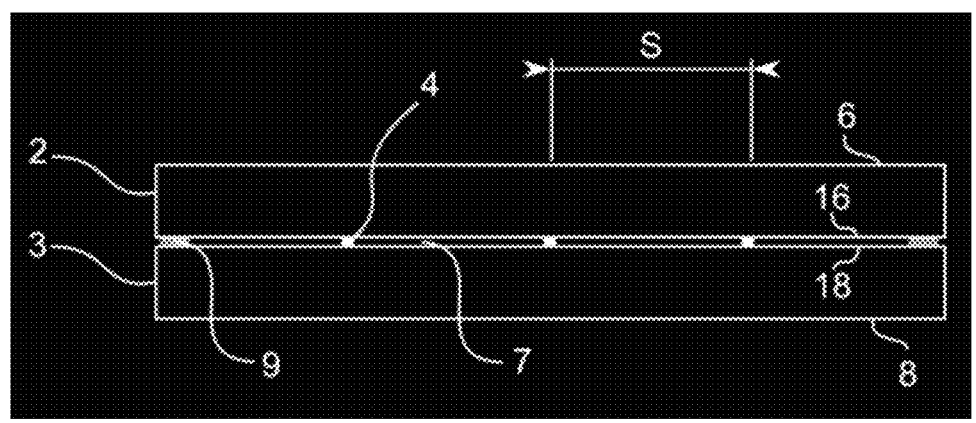
FIG. 1b is a cross-section view of a vacuum insulated glazing unit according to an embodiment.

FIG. 1b is cross-section of the vacuum insulated glazing unit and shows the plurality of spacers 4, separated by a distance S, and arranged in the gap between the inner surface 16 of the first glass pane 2 and the inner surface 18 of the second glass pane 3. FIG. 1b also shows a side seal material 9 that is disposed at the periphery of the glass panes 2,3 and provided between the two glass panes 2, 3. The second glass pane 3 also includes an outer surface 8.

Any suitable glass can be used for the glass panes, for example a soda lime silica glass or an alkali aluminosilicate glass. The glass panes can have the same or different thickness, and the thickness can be 1 to 6 mm, preferably 2 to 4 mm, more preferably 2.5 to 3.5 mm. The glass panes are substantially transparent to visible light (i.e. at least about 50% transparent, more preferably at least about 70% transparent, more preferably at least about 80% transparent, and most preferably at least about 90% transparent), although they may be tinted in some embodiments.

The side seal material is attached around the periphery of the first glass pane and the second glass pane and forms a sealed cavity between the glass panes. Any suitable side seal material can be used, including solder glass, indium, Ostalloy 313-4, 99% indium (In) wire available from Arconium (Providence, R.I.), liquid glass (i.e., glass composition with water in it when applied, wherein the water evaporates when heated to form the inner seal portion 45), rubber, silicone rubber, butyl rubber, Indalloy No. 53 available from Indium Corp. in paste form having a composition of 67% Bi and 33% In (% by weight), Indalloy No. 1 from Indium Corp. in paste form having a composition of 50% Sn, Indalloy No. 290 available from Indium Corp. in paste form having a composition of 97% In and 3% Ag, Indalloy No. 9 from Indium Corp. in paste form having a composition of 70% Sn, 18% Pb and 12% In, Indalloy No. 281 available from Indium Corp. in paste form having a composition of 58% Bi and 42% Sn, Indalloy No. 206 available from Indium Corp. in paste form having a composition of 60% Pb and 40% In, Indalloy No. 227 available from Indium Corp. in paste form having a composition of 77.2% Sn, 20% In, and 2.8% Ag, Indalloy No. 2 available from Indium Corp. in paste form having a composition of 80% In, 15% Pb and 5% Ag, Indalloy No. 3 available from Indium Corp. in paste form having a composition of 90% In and 10% Ag, or any other suitable material. The side seal material can be a soldering material, for example a glass solder frit with a low melting temperature, wherein thermal treatment can be used to hermetically seal the periphery of the VIG unit. For example, the side seal material may comprise a glass solder frit paste with a low melting temperature, where the paste further comprises of about 70 wt % of an organic binder, inorganic fillers, and solvents, for example water or alcohol. In an embodiment, the frit material includes vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or a combination thereof. The soldering material may be provided as a combination of two different materials comprising glass solder frit with different thermal expansion coefficients that are adjusted to correspond to the thermal expansion coefficients of the bonded parts. Also several solder materials may allow pre-sintering of a first solder to the glass surface and subsequently use of a second solder to join to the first solder. Examples of seals are shown in WO 02/27135 and EP 1 422 204. Alternatively, other materials may be employed, such as a metal band seal as disclosed e.g. in US 2015/218877.

The mechanical properties of the glass panes can be modified, e.g., strengthened, by ion implantation. Before the ions are implanted the glass may cleaned with ultrasonic waves etc. Ion implantation or bombardment of the glass pane surface with large atoms, which become embedded in the glass pane surface by means of surface treatment or bombardment, can provide beneficial compressive stresses in the glass pane surface. The ions can be implanted using any suitable method. For example, positively or negatively charged ions are generated by an ion source which produces and implants the ions using an appropriate energy for the given ion. The ion dosage can be $10^{12}$ ions/cm$^2$ and $10^{18}$ ions/cm$^2$. Because of their higher energy ions carrying a higher charge will be implanted deeper into the surface of a glass pane than ions carrying a lower charge. Therefore, for a given total ion dosage, a narrow depth distribution can be obtained when single charged ions are implanted and a wider depth distribution can obtained when single charged and multiply charged ions are implanted simultaneously.

The plurality of implanted ions can be nitrogen ions, carbon ions, argon ions, or a combination comprising at least one of the foregoing. For example, the plurality of ions can include at least two different ions. In an embodiment, the plurality of implanted ions are a combination of nitrogen ions and carbon ions. In another embodiment, the plurality of implanted ions are a combination of argon ions and carbon ions. In yet another embodiment, the plurality of implanted ions are a combination of nitrogen ions and argon ions. In an embodiment, the plurality of implanted ions comprises nitrogen ions. In an embodiment, the plurality of implanted ions are nitrogen ions. In another embodiment, the plurality of implanted ions are argon ions. In a further embodiment, the implanted ions are carbon ions.

The plurality of implanted ions can have an implant depth of at least 10 nm, preferably at least 15 nm, more preferably at least 20 nm. For example, the plurality of implanted ions can have an implant depth of 1 to 500 nm. In an embodiment, the implant depth can preferably be of 10 to 200 nm. In another embodiment, the implant depth can more preferably be of 20 to 100 nm. In an embodiment, the plurality of implanted ions have an implant depth of 5 to 50 nm. In a preferred embodiment, the implant depth can be of 10 to 40 nm. In a more preferred embodiment, the implanted ions can have an implant depth of 15 to 35 nm. In yet a more preferred embodiment, the implanted ions can have an implant depth of 15 to 30 nm. In another embodiment, the plurality of implanted ions have an implant depth of 1 to 100 nm, preferably 5 to 60 nm, more preferably 10 to 40 nm.

In an embodiment, at least a portion of the inner surface of the second glass pane comprises a strengthened portion that comprises a plurality of implanted ions. The implanted ions in the second glass pane can be the same as or different from the implanted ions in the first glass pane. In an embodiment, the plurality of implanted ions are nitrogen ions, carbon ions, argon ions, or a combination comprising at least one of the foregoing. When the implanted ions do not encompass the entire inner surface, a separation distance between each of the strengthened portions can 20 to 150 mm, preferably 20 to 100 mm, more preferably 20 to 60 mm, as measured center-to-center between the approximate centers of the surface area that includes the strengthened portions.

The plurality of implanted ions form strengthened portions on the inner surface of the glass panes. The strengthened portions can be continuous over the entire inner surface, or individual or discrete strengthened portions can be separated by one or more non-strengthened portions that do not have implanted ions. In an embodiment, the inner surface of at least the first glass pane comprises a plurality of spacer contact regions, wherein each spacer contact region comprises the plurality of implanted ions and is in contact with a spacer of the plurality of spacers. In other words, one or more strengthened portions of the inner surface of the first glass pane can be spacer contact regions which can be positioned to contact each spacer. In another embodiment, the inner surfaces of the first glass pane and the second glass pane include the plurality of spacer contact regions.

The spacer contact region overlaps, for example completely overlaps, the spacer. Each spacer can be arranged to individually contact the center of the spacer contact region, the entire spacer contact region, a portion of the spacer contact region, a portion of two or more different spacer contact regions, or the like. In an embodiment, at least some of the spacers do not contact a spacer contact region. In another embodiment, each spacer in the plurality of spacers is in contact with a spacer contact region. In still another embodiment, one or more spacers can be in contact with a spacer contact region. The largest axis of the spacer contact region can be equal to or 25% greater, preferably equal to or 30% greater, more preferably equal to or 40% greater than the width of the spacer, as measured in the plane of the first and second glass panes. For example, the largest axis of the spacer contact region can be 25% to 55% greater, preferably 25% to 50% greater, more preferably 25% to 45% greater, even more preferably 35% to 45% greater than the width of the spacer, as measured in the plane of the first and second glass panes. As used herein, the "largest axis of the spacer contact region" means the largest measurable distance across the spacer contact region in the plane of the glass panes.

Referring to FIG. 1b, the spacers 4 provide, and thus define the distance of, the gap 7 between the inner surfaces 16, 18 of the glass panes 2, 3. The spacers 4 may be integral or adhered to the inner surfaces of the glass panes. The spacers 4 alternatively may be discrete and held in position by atmospheric pressure on the outer surfaces of the glass panes. The spacers 4 can have any suitable shape, for example spherical, cylindrical, square, rectangular, rod-like, bead-like, oval, trapezoidal, or the like.

The spacers 4 can be arranged in an array separated by a distance S between adjacent spacers. The distance between spacers, or the spacer-to-spacer distance between each adjacent spacer, is 20 to 120 mm, preferably 25 to 80 mm, more preferably 30 to 60 mm. In an embodiment, the distance between spacers is measured from an outer edges of adjacent spacers. In another embodiment, the distance between spacers is measured from the centers of adjacent spacers. The spacer-to-spacer distance can be the same or different between each adjacent spacer. In an embodiment, the spacer-to-spacer distance between each adjacent spacer, is the same or different, and is independently 20 to 120 mm, preferably 25 to 80 mm, more preferably 30 to 60 mm. Greater distances between spacers can increase the compressive load on each spacer and can cause a VIG unit to lose vacuum due to stress and cracks.

The spacers can have a height of 0.05 to 0.7 mm, preferably 0.1 to 0.4 mm, more preferably 0.15 to 0.3 mm. In some embodiments, the spacers have the same height. In another embodiment, each spacer independently has a height of 0.05 to 0.7 mm, preferably 0.1 to 0.4 mm, more preferably 0.15 to 0.3 mm. The spacers can have width of 0.1 to 1 mm, preferably 0.2 to 0.8 mm, more preferably 0.3 to 0.7 mm.

The spacer can be any suitable material, for example solder glass, a polymer (e.g., Teflon), plastic, ceramic, glass, metal, or the like. In an embodiment, the spacer comprises a steel or a solder glass. Examples of spacers are shown in e.g. WO 2016/027750 and WO 2016/144857, and the spacers may be provided as a glass frit paste that is printed onto the inner surface of at least one of the two glass panes and subsequently heated to form the spacers as shown in e.g. AT 14327 U.

The spacer can include a surface coating that is disposed on the outer surface of the spacer to reduce cracks in the glass panes and reduce scratches when the glass panes flex and move. Any suitable surface coating may be used, for example a surface coating that comprises a low coefficient of friction (e.g., has a lower coefficient of friction than the spacer material). The surface coating can include tungsten disulfide ($WS_2$), molybdenum disulfide ($MoS_2$), tungsten diselenide ($WSe_2$), molybdenum diselenide ($MoSe_2$), or a combination thereof. In some embodiments, the surface coating is disposed on the top and/or bottom of the spacer. As used herein, "top" and "bottom" of the spacer means the portions of the spacer configured to contact the glass pane, for example that contact the spacer contact regions of the glass pane. In an embodiment, the surface coating is in contact with the inner surface of at least one of the glass panes.

The glass pane can have a break strength of 150 N or greater, preferably 300 N or greater, more preferably 400 N or greater, as measured with an applied force in a direction substantially perpendicular to a region of the outer surface that is aligned with the spacer contact region of the inner surface. In some embodiments, the break strength is the same or different at each region of the outer surface that is aligned with the spacer contact region of the inner surface.

The glass panes can also include a low-emittance or low-emissivity (low-E) surface coating. Any suitable low-E coating can be used. In an embodiment, the inner surface of at least the first glass pane further comprises a low-emittance coating. For example, the inner surfaces of the first and second glass panes can each have the same or different low-emittance coatings. In an embodiment, the inner surface of a glass pane comprising the strengthened portion further comprises a low-emittance coating. Low-E coating may comprise several layers, including silver layer(s). Low-E coatings can include a layer of an infrared-reflecting film and one or more optional layers of a transparent dielectric film. The infrared-reflecting film, which can include a conductive metal such as silver, gold, or copper, reduces the transmission of heat through the coated pane. A dielectric film can be used to anti-reflect the infrared-reflecting film and to control other properties and characteristics of the coating, such as color and durability. Commonly used dielectric materials include oxides of zinc, tin, indium, bismuth, and titanium, among others.

Example low-E coatings include one or two silver layers each sandwiched between two layers of a transparent dielectric film. Increasing the number of silver layers can increase the total infrared reflection, although additional silver layers can also reduce the visible transmission through the window and/or negatively impact the coating's color or durability. In one example, the low-E coating comprises multiple layers including a layer of $Si_3N_4$ which may be advantageous for strengthening by ion implantation, and in particular nitrogen ion implantation. The low-E coating in contact with the spacer can affect the way the spacer interfaces with the inner surface of the glass pane and reduce the amount of cracking in the glass.

In an embodiment, the low-E coating can include implanted ions. For example, the low-E coating and the inner surface of a glass pane can each include implanted ions. It should be understood that the portion of the inner surface of the first glass pane that comprises the strengthened portion that comprises the plurality of implanted ions also includes configurations wherein the low-E coating on the inner surface of the first glass pane includes the implanted ions. In other words, in some embodiments the implanted ions are located in the low-E coating that is disposed on the glass pane, because of the selected implant depth of the ions. In an embodiment, the low-E coating has a thickness of 1 to 500 nm, preferably 10 to 400 nm, more preferably 20 to 300 nm, even more preferably 50 to 250 nm. In some embodiments, the low E-coating has a thickness of 1 to 500 nm and the implanted ions have an implant depth of 1 to 500 nm. In an embodiment, the plurality of implanted ions form strengthened portions on the inner surface of the glass pane that includes a low-E coating on the inner surface, wherein the low E-coating has a thickness of 100 to 500 nm and the implanted ions have an implant depth of 1 to 200 nm, for example 1 to 100 nm, for example 1 to 50 nm.

Optical coatings may be applied using a suitable film-forming process such as physical or chemical vapor deposition or, for larger area glass panes, via lamination. During the lamination process, a thin film of the coating material is typically heated to a temperature effective to soften the coating material, which promotes a conformal mating of the coating material to a surface of a glass pane. Mobile polymer chains within the coating material develop bonds with the glass surfaces, which promote adhesion. Elevated temperatures also accelerate the diffusion of residual air and/or moisture from the glass-coating interface.

The glass panes can be annealed and/or tempered to increase strength. The term "tempered glass pane" as used herein is understood to mean glass panes in which compressive stresses have been introduced in the surface(s) of the glass pane. For glass to be considered strengthened this compressive stress on the surface(s) of the glass can be a minimum of 69 MPa (10,000 psi) and may be higher than 100 MPa. The VIG is heated during production in order to form the periphery seal etc. and some glass strength may be annealed or lost during manufacture.

The glass panes can be annealed, for example annealed at a temperature of at least 375° C. Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass pane. After tempering, the stress developed by the glass can be high, and the mechanical strength of tempered glass can be four to five times greater than that of annealed glass. Both the first glass pane and the second glass pane may be tempered glass panes e.g. tempered by thermal tempering.

Thermally tempered glass may be produced by means of a furnace in which an annealed glass pane is heated to a temperature of approximately 600-700° C., after which the glass pane is rapidly cooled. The cooling introduces the compressive stresses into the glass pane surface(s).

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which causes the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane. Methods of plasma tempering are disclosed e.g. in US 2013/0059087 A1 and in US 2013/0059160 A1.

The vacuum insulated glazing unit can also include a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween; a plurality of spacers arranged in the gap between of the inner surface of the first glass pane and the inner surface of the second glass pane; and a side seal material attached around a periphery of the first glass pane and the second glass pane, thereby forming a sealed cavity between the glass panes, wherein the inner surface of the first glass pane comprises a strengthened portion that comprises a plurality of implanted ions. In an embodiment, the inner surfaces of the first glass pane and the second glass pane comprise a strengthened portion comprising a plurality of implanted ions. In another embodiment, the first glass pane and the second glass pane comprise tempered glass. In still another embodiment, the inner surface of the first glass pane comprises a low-emittance coating.

Also provided is a tempered glass pane for a vacuum insulated glazing unit, the tempered glass pane comprising a first surface and a second surface, wherein the first surface comprises a low-emittance coating, and wherein at least a portion of the first surface comprises a strengthened portion that comprises a plurality of implanted ions. In an embodiment, the tempered glass pane comprises a first surface and a second surface, wherein the first surface comprises a low-emittance coating, and wherein the first surface comprises a plurality of implanted ions. In still another embodiment, the glass pane comprises a first surface and a second surface, wherein at least a portion of the first surface comprises a strengthened portion that comprises a plurality of implanted ions.

According to another aspect, a method for modifying a tempered glass pane for a vacuum insulated glazing unit is provided. The method includes implanting a plurality of ions into at least a portion of a first surface of the tempered glass pane to form a strengthened portion, wherein the strengthened portion comprises a plurality of nitrogen ions, carbon ions, argon ions, or a combination comprising at least one of the foregoing. In another embodiment, the method includes forming a low-emittance coating on a first surface of the tempered glass pane; and implanting a plurality of ions into at least a portion of the first surface to form a strengthened portion, wherein the strengthened portion comprises a plurality of nitrogen ions, carbon ions, argon ions, or a combination comprising at least one of the foregoing.

In still another aspect, a method for producing a vacuum insulated glazing unit is provided. The method includes implanting a plurality of ions into at least a portion of a first surface of a first glass pane to form a strengthened portion; and combining the first glass pane, a second glass pane, a plurality of spacers, and a side seal material to produce the vacuum insulated glazing unit. The vacuum insulated glazing unit can include the first glass pane and the second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween; the plurality of spacers arranged in the gap between of the inner surface of the first glass pane and the inner surface of the second glass pane; and the side seal material attached around a periphery of the first glass pane and the second glass pane, thereby forming a sealed cavity between the glass panes, wherein the inner surface of the first glass pane is the first surface of the first glass pane.

In an embodiment, the method further includes reducing the pressure in the sealed cavity, for example by applying a vacuum to an evacuation hole to provide a hermetically sealed VIG unit. The pressure in the sealed cavity may be reduced to a level equal to or below about $10^{-5}$ bar, more preferably below $10^{-6}$ bar, and most preferably below $10^{-7}$ bar of atmospheric pressure. In an embodiment, the strengthened portion comprises a plurality of nitrogen ions, carbon ions, argon ions, or a combination comprising at least one of the foregoing. In still other embodiments, the method can further include one or more of implanting a plurality of ions into at least a portion of a first surface of the second glass pane to form a strengthened portion prior to the step of combining, wherein the inner surface of the second glass pane is the first surface of the second glass pane; thermally tempering at least one of the glass panes prior to the step of implanting; forming a low emittance coating on the inner surface of at least one of the glass panes prior to the step of implanting; or forming a low emittance coating on the inner surface of at least one of the glass panes after the step of implanting.

Articles may be prepared to include the vacuum insulated glass unit described herein. In an embodiment, a window includes the vacuum insulated glass unit. The window may further include a frame. The window may be used for residential or commercial purposes.

Also provided is use of the articles herein. For example, an embodiment provides use of the vacuum insulated glazing unit for a window. An embodiment provides use of the glass pane and/or the tempered glass pane for a vacuum insulated glazing unit. Another embodiment provides use of the window for a fixed or ventilating window of a commercial building and/or residential building. Another embodiment provides use of the window for a roof window or a skylight window, for example a fixed or ventilating window for a roof or a skylight. Still another embodiment provides use of the window for a vertical window application, such as for use on the side of a commercial and/or residential building. The vacuum insulated glazing unit, glass pane, tempered glass pane, and window described herein can also be used for other applications that use a window or transparent screens, for example viewports, console screens, time pieces, vehicles, and others.

This disclosure is further illustrated by the following examples, which are non-limiting.

EXAMPLES

Example 1

A vacuum insulated glazing unit including implanted ions was prepared.

First and second glass panes (soda lime silica, 4 mm) were prepared by annealing and tempering. The inner surface of the first glass pane was then coated with a low-emissivity coating (silver/silicon nitride). Subsequently, the inner surface of the first glass pane was bombarded with carbon ions to form strengthened portions that included the implanted carbon ions.

The vacuum insulated glazing unit was then assembled and included a first glass pane and a second glass pane arranged in parallel and having a plurality of spacers (0.5 mm×0.2 mm; nickel with a tungsten disulfide coating) arranged in the gap (0.2 mm) between of the inner surface of the first glass pane and the inner surface of the second glass pane. An edge seal material (vanadium oxide frit, solvent, binder) was attached around a periphery of the glass panes to form a cavity. A vacuum was applied to the cavity via an evacuation hole in the first glass pane and the unit was heated to dry the edge seal material. The cavity was then sealed under vacuum.

Example 2

A vacuum insulated glazing (VIG) unit was prepared as in Example 1, except the first glass pane was not coated with a low-emissivity coating or bombarded with carbon ions.

Example 3

A vacuum insulated glazing (VIG) unit was prepared as in Example 1, except the first glass pane was not bombarded with carbon ions.

Evaluation Example 1

Figure 2A:
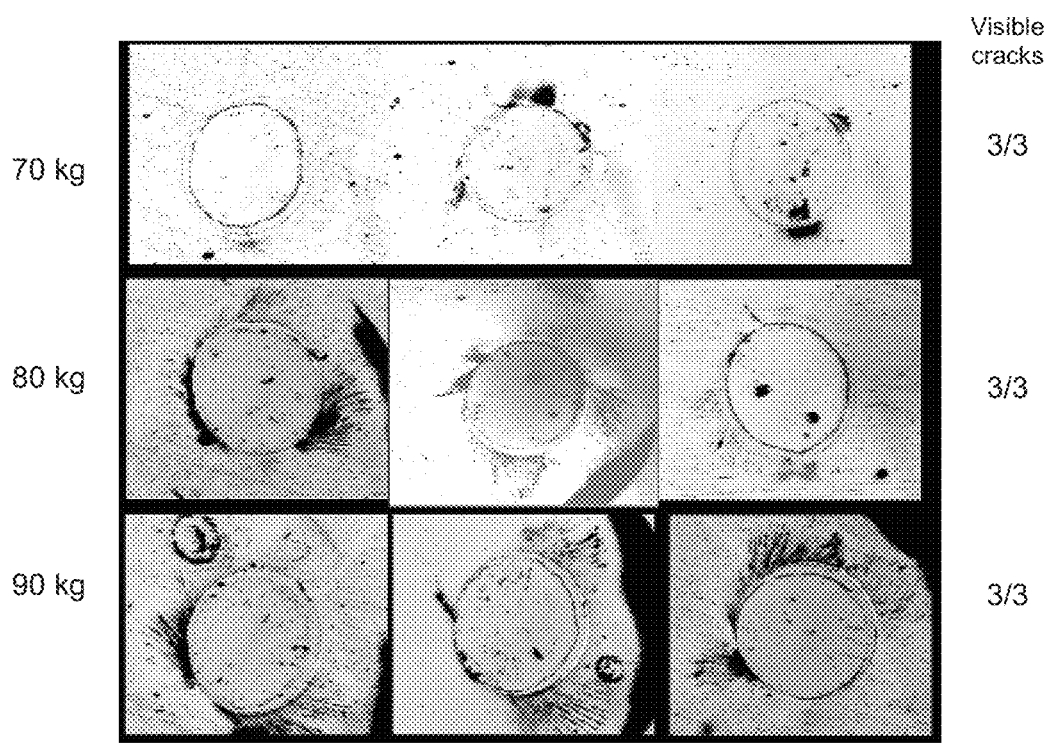
FIG. 2a is an array of microscope photographs of glass panes after testing according to an embodiment, for visually evaluating cracks in the glass panes.
Figure 2B:
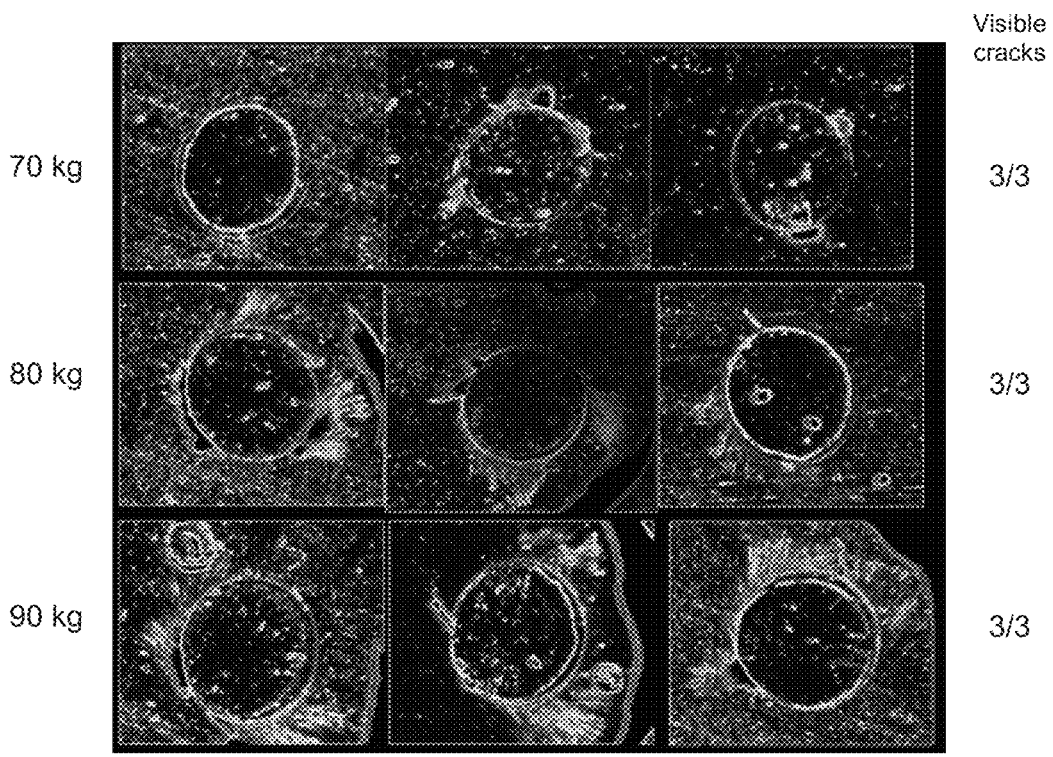

VIG units of Example 2 were separately subjected to loads of 70, 80, and 90 kg (i.e., normal force), with the testing repeated three times at each load. Each VIG unit was only tested once. FIG. 2a is an array of a microscope images looking through the first glass pane in a region contacted by a spacer. FIG. 2b is a filtered version of the array of microscope photographs shown in FIG. 2a. The results showed that visible cracks developed in the glass pane for all of the samples under all of the load conditions. Such cracks may cause the VIG unit to increase pressure through loss of vacuum, and deteriorate the insulation performance.

Evaluation Example 2

Figure 3A:
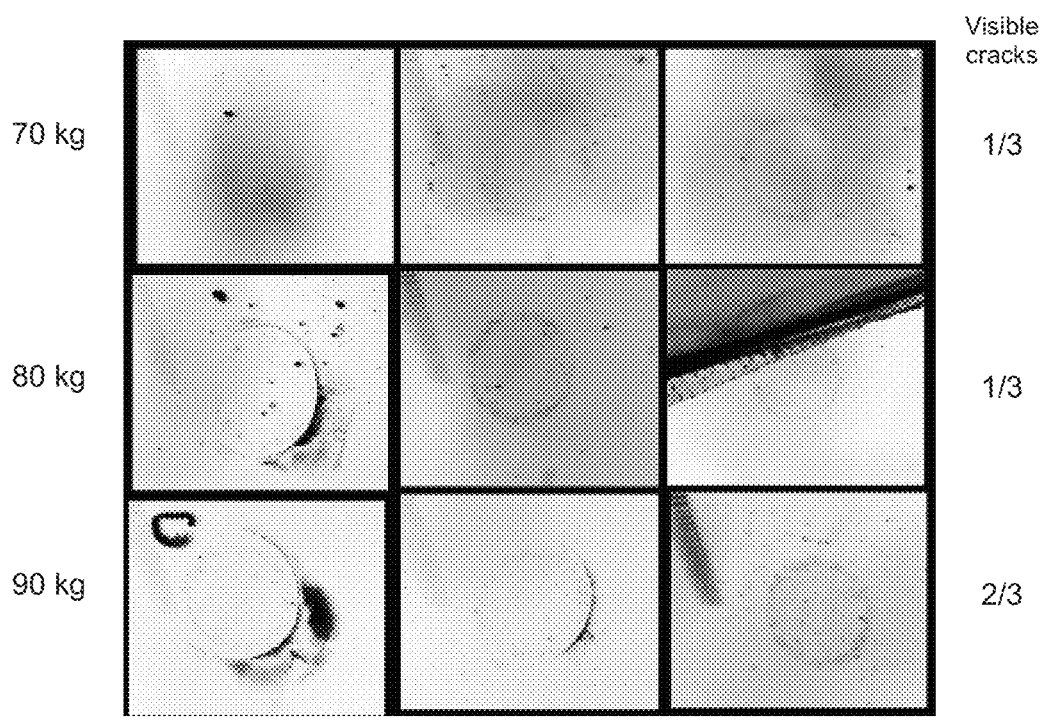
FIG. 3a is an array of microscope photographs of glass panes after testing according to another embodiment, for visually evaluating cracks in the glass panes.
Figure 3B:
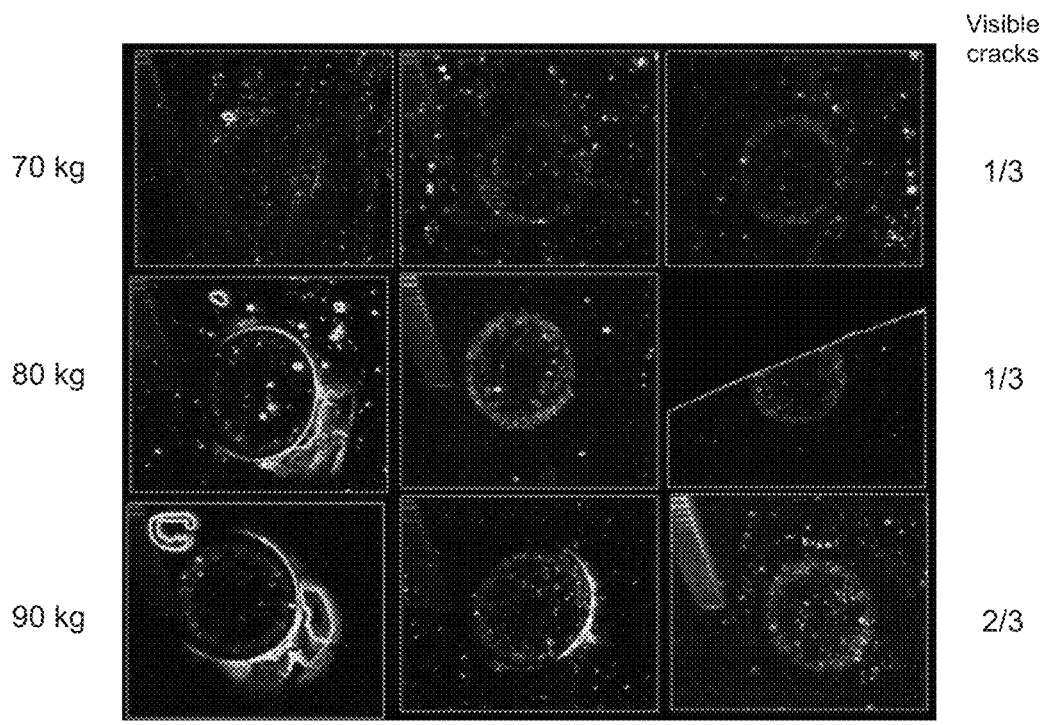

VIG units of Example 3 were separately subjected to loads of 70, 80, and 90 kg, with the testing repeated three times at each load. Each VIG unit was only tested once. FIG. 3a is an array of a microscope images looking through the first glass pane in a region contacted by a spacer. FIG. 3b is a filtered version of the array of microscope photographs shown in FIG. 3a. The results showed that the low-E coating visually alters the appearance of the cracks formed in the glass panes. Overall, the low-E coating resulted in fewer visible cracks.

Evaluation Example 3

Figures 4A, 4B:
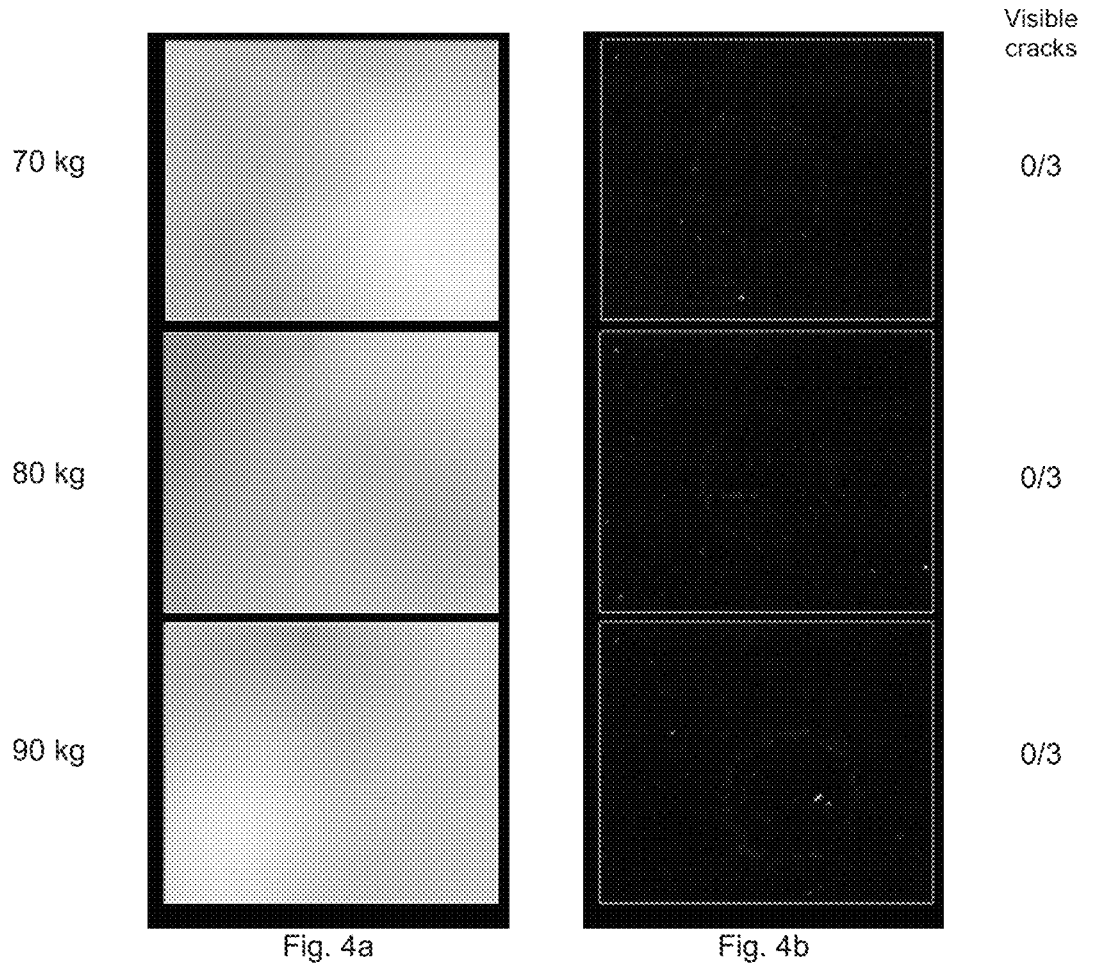

VIG units of Example 1 were separately subjected to loads of 70, 80, and 90 kg. Each VIG unit was only tested once. FIG. 4a is an array of a microscope images looking through the first glass pane in a region contacted by a spacer. FIG. 4b is a filtered version of the series of microscope photographs shown in FIG. 4a. The results show that low-E coating and implanted carbon ions resulted in no cracking of the glass panes.

Evaluation Example 4

Figure 5:
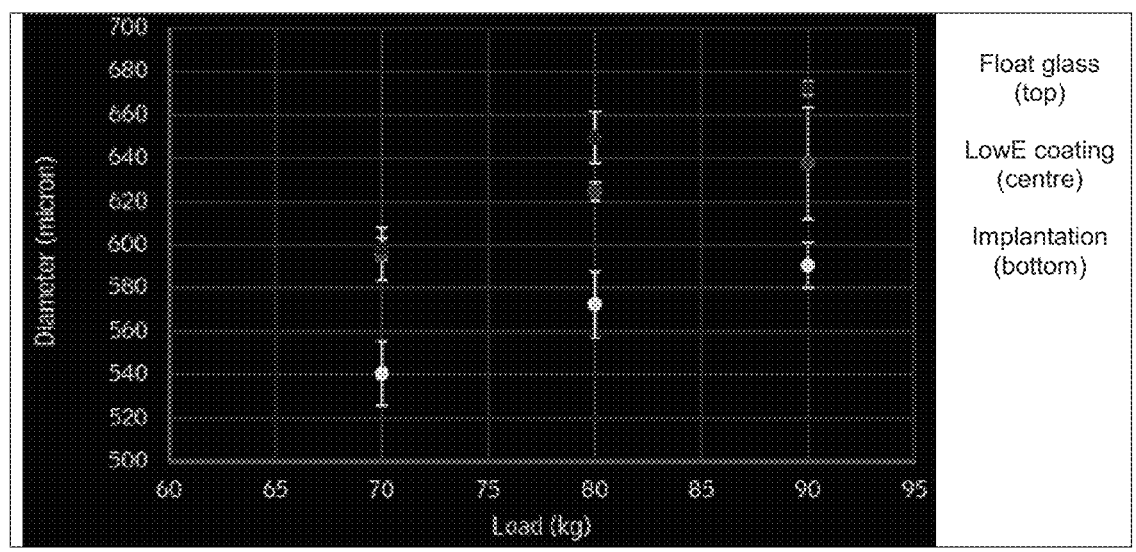
FIG. 5 is a graph of indentation diameter (micron) versus applied load (kilograms, kg) showing the resulting indentations in the glass panes after testing according to an embodiment.

The VIG units tested in Evaluation Examples 1-3 were evaluated for indentations into the inner glass surface at locations in contact with the spacers. FIG. 5 is graph of indentation diameter (micron) versus load (kg). The results show increasing indentation diameter with increasing load for all of the VIG units. The VIG units of Evaluation 1 had the largest diameters, whereas the VIG units of Evaluation 3 had the smallest diameters. The ion implantation process reduces the pillar indentations into the glass pane, which is advantageous for the VIG unit.

The disclosure is further described in the following items.

Item List

1. A vacuum insulated glazing 1 unit comprising:
a first glass pane 2 and a second glass pane 3 arranged in parallel, the second glass pane 3 spaced apart from the first glass pane 2, wherein each glass pane 2, 3 comprises an inner surface 16, 18 and an outer surface 6, 8, wherein the inner surface of the first glass pane 16 and the inner surface of the second glass pane 18 define a gap 7 therebetween;
a plurality of spacers 4 arranged in the gap 7 between of the inner surface of the first glass pane 16 and the inner surface of the second glass pane 18; and
a side seal material 9 attached around a periphery of the first glass pane 2 and the second glass pane 3, thereby forming a sealed cavity between the glass panes 2, 3,
wherein at least a portion of the inner surface of the first glass pane 16 comprises a strengthened portion that comprises a plurality of implanted ions.
2. The vacuum insulated glazing unit 1 according to item 1, wherein the plurality of implanted ions are nitrogen ions, carbon ions, argon ions, or a combination comprising at least one of the foregoing.
3. The vacuum insulated glazing unit 1 according to item 2, wherein the plurality of implanted ions comprises at least two different ions.
4. The vacuum insulated glazing unit 1 of item 2, wherein the plurality of implanted ions comprises nitrogen ions.
5. The vacuum insulated glazing unit 1 according to any of the preceding items, wherein the plurality of implanted ions have an implant depth of 5 to 50 nm, preferably 10 to 40 nm, more preferably 15 to 35 nm, even more preferably 15 to 30 nm.
6. The vacuum insulated glazing unit 1 according to any of the preceding items, wherein the plurality of implanted ions have an implant depth of 1 to 500 nm, preferably 15 to 200 nm, more preferably 20 to 100 nm.
7. The vacuum insulated glazing unit 1 according to any of the preceding items, wherein the plurality of implanted ions have an implant depth of 1 to 100 nm, preferably 5 to 60 nm, more preferably 10 to 40 nm.
8. The vacuum insulated glazing unit 1 according to any of the preceding items, wherein at least a portion of the inner surface of the second glass pane 18 comprises a strengthened portion that comprises a plurality of implanted ions.
9. The vacuum insulated glazing unit 1 according to any of the preceding items, wherein the inner surface 16, 18 of at least one of the first glass pane 2 and the second glass pane 3 comprises a plurality of strengthened portions.
10. The vacuum insulated glazing unit 1 according item 9, wherein the plurality of strengthened portions are separated by one or more non-strengthened portions that do not have implanted ions.
11. The vacuum insulated glazing unit 1 according item 10, wherein a separation distance between each of the strengthened portions is 20 to 150 mm, preferably 20 to 100 mm, more preferably 20 to 60 mm, as measured center-to-center.
12. The vacuum insulated glazing unit 1 according to any of the preceding items, wherein substantially all of the inner surface of the first glass pane 16 comprises the strengthened portion.
13. The vacuum insulated glazing unit 1 according to any of the preceding items, wherein the inner surface of at least the first glass pane 16 comprises a plurality of spacer contact regions, wherein each spacer contact region comprises the plurality of implanted ions and is in contact with a spacer of the plurality of spacers.
14. The vacuum insulated glazing unit 1 according to item 13, wherein the largest axis of the spacer contact region is 25% to 55% greater, preferably 25% to 50% greater, more preferably 25% to 45% greater, even more preferably 35% to 45% than the width of the spacer, as measured in the plane of the first glass pane 2 and second glass panes 3.
15. The vacuum insulated glazing unit 1 according to any of the preceding items, wherein the spacer comprises a metal, a ceramic, or a glass.
16. The vacuum insulated glazing unit 1 according to item 15, wherein the spacer comprises a steel or a solder glass.
17. The vacuum insulated glazing unit 1 according to any of the preceding items, wherein the spacer has a height of 0.05 to 0.7 mm, preferably 0.1 to 0.4 mm, more preferably 0.15 to 0.3 mm.
18. The vacuum insulated glazing unit 1 according to any of the preceding items, further comprising a surface coating disposed on the spacer, wherein the surface coating is in contact with the inner surface of at least one of the glass panes 16, 18.
19. The vacuum insulated glazing unit 1 of item 18, wherein the surface coating comprises a low coefficient of friction.

20. The vacuum insulated glazing unit 1 of item 19, wherein the surface coating comprises a tungsten disulfide coating.

21. The vacuum insulated glazing unit 1 according to any of the preceding items, wherein a spacer-to-spacer distance between each adjacent spacer is 20 to 120 mm, preferably 25 to 80 mm, more preferably 30 to 60 mm.

22. The vacuum insulated glazing unit 1 according to any of the preceding items, wherein the glass pane has a break strength of 150 N or greater, preferably 300 N or greater, more preferably 400 N or greater, as measured with an applied force in a direction substantially perpendicular to a region of the outer surface 6, 8 that is aligned with the spacer contact region of the inner surface 16, 18.

23. The vacuum insulated glazing unit 1 according to any of the preceding items, wherein the inner surface of at least the first glass pane 16 further comprises a low-emittance coating.

24. The vacuum insulated glazing unit 1 according to any of the preceding items, wherein the inner surfaces of both glass panes 16, 18 comprise a low-emittance coating.

25. The vacuum insulated glazing unit 1 according to any of the preceding items, wherein at least one of the glass panes 2, 3 is a tempered glass pane.

26. The vacuum insulated glazing unit 1 according to item 25, wherein the tempered glass pane 2, 3 has been tempered by thermal tempering, chemical tempering, plasma tempering, or a combination comprising at least one of the foregoing.

27. The vacuum insulated glazing unit 1 according to any of the preceding items, wherein at least one of the glass panes 2, 3 has a thickness of 1 to 6 mm, preferably 2 to 4 mm, more preferably 2.5 to 3.5 mm.

28. The vacuum insulated glazing unit 1 according to any of the preceding items, wherein the inner surface 16, 18 comprising the strengthened portion further comprises a low-emittance coating.

29. The vacuum insulated glazing unit 1 according to any of the preceding items, wherein at least one of the glass panes 2, 3 is a soda lime silica glass.

30. The vacuum insulated glazing unit 1 according to any of the preceding items, wherein the at least one of the first glass pane 2 and second glass pane 3 is annealed at a temperature of at least 375° C.

31. The vacuum insulated glazing unit 1 according to any of the preceding items, wherein at least one of the glass panes 2, 3 is annealed.

32. The vacuum insulated glazing unit 1 according to any of the preceding items, wherein the side seal material 9 comprises a glass solder frit material.

33. A vacuum insulated glazing unit 1 comprising:
a first glass pane 2 and a second glass pane 3 arranged in parallel, the second glass pane 3 spaced apart from the first glass pane 2, wherein each glass pane 2, 3 comprises an inner surface 16, 18 and an outer surface 6, 8, wherein the inner surface of the first glass pane 16 and the inner surface of the second glass pane 18 define a gap 7 therebetween;
a plurality of spacers 4 arranged in the gap between of the inner surface of the first glass pane 16 and the inner surface of the second glass pane 18; and
a side seal material 9 attached around a periphery of the first glass pane 2 and the second glass pane 3, thereby forming a sealed cavity between the glass panes 2, 3,
wherein the inner surface of the first glass pane 16 comprises a strengthened portion that comprises a plurality of implanted ions.

34. A vacuum insulated glazing unit 1 comprising:
a first glass pane 2 and a second glass pane 3 arranged in parallel, the second glass pane 3 spaced apart from the first glass pane 2, wherein each glass pane 2, 3 comprises an inner surface 16, 18 and an outer surface 6, 8, wherein the inner surface of the first glass pane 16 and the inner surface of the second glass pane 18 define a gap 7 therebetween;
a plurality of spacers 4 arranged in the gap 7 between of the inner surface of the first glass pane 16 and the inner surface of the second glass pane 18; and
a side seal material 9 attached around a periphery of the first glass pane 2 and the second glass pane 3, thereby forming a sealed cavity between the glass panes 2, 3,
wherein the inner surfaces of the first glass pane 16 and the second glass pane 18 comprise a strengthened portion comprising a plurality of implanted ions.

35. A vacuum insulated glazing unit 1 comprising:
a first glass pane 2 and a second glass pane 3 arranged in parallel, the second glass pane 3 spaced apart from the first glass pane 2, wherein each glass pane 2, 3 comprises an inner surface 16, 18 and an outer surface 6, 8, wherein the inner surface of the first glass pane 16 and the inner surface of the second glass pane 18 define a gap 7 therebetween, and wherein the first glass pane 2 and the second glass pane 3 comprise tempered glass;
a plurality of spacers 4 arranged in the gap 7 between of the inner surface of the first glass pane 16 and the inner surface of the second glass pane 18; and
a side seal material 9 attached around a periphery of the first glass pane 2 and the second glass pane 3, thereby forming a sealed cavity between the glass panes 2, 3,
wherein at least a portion of the inner surface of the first glass pane 16 comprises a strengthened portion that comprises a plurality of implanted ions.

36. A vacuum insulated glazing unit 1 comprising:
a first glass pane 2 and a second glass pane 3 arranged in parallel, the second glass pane 3 spaced apart from the first glass pane 2, wherein each glass pane 2, 3 comprises an inner surface 16, 18 and an outer surface 6, 8, wherein the inner surface of the first glass pane 16 and the inner surface of the second glass pane 18 define a gap 7 therebetween, and wherein the inner surface of the first glass pane 16 comprises a low-emittance coating;
a plurality of spacers 4 arranged in the gap 7 between of the inner surface of the first glass pane 16 and the inner surface of the second glass pane 18; and
a side seal material 9 attached around a periphery of the first glass pane 2 and the second glass pane 3, thereby forming a sealed cavity between the glass panes 2, 3,
wherein at least a portion of the inner surface of the first glass pane 16 comprises a strengthened portion that comprises a plurality of implanted ions.

37. A tempered glass pane 2, 3 for a vacuum insulated glazing unit 1, the tempered glass pane 2, 3 comprising a first surface and a second surface, wherein the first surface comprises a low-emittance coating, and wherein at least a portion of the first surface comprises a strengthened portion comprising a plurality of implanted ions.

38. A tempered glass pane 2, 3 for a vacuum insulated glazing unit 1, the tempered glass pane 2, 3 comprising a first surface and a second surface, wherein the first surface comprises a low-emittance coating, and wherein the first surface comprises a plurality of implanted ions.

39. A tempered glass pane 2, 3 for a vacuum insulated glazing unit 1, the tempered glass pane 2, 3 comprising a first surface and a second surface, wherein the first surface comprises a low-emittance coating comprising a plurality of implanted ions.

40. A glass pane 2, 3 for a vacuum insulated glazing unit 1, the glass pane 2, 3 comprising a first surface and a second surface, wherein at least a portion of the first surface comprises a strengthened portion that comprises a plurality of implanted ions.

41. A method for modifying a tempered glass pane 2, 3 for a vacuum insulated glazing unit 1, the method comprising implanting a plurality of ions into at least a portion of a first surface of the tempered glass pane 2, 3 to form a strengthened portion, wherein the strengthened portion comprises a plurality of nitrogen ions, carbon ions, argon ions, or a combination comprising at least one of the foregoing.

42. A method for modifying a tempered glass pane 2, 3 for a vacuum insulated glazing unit 1, the method comprising:
forming a low-emittance coating on a first surface of the tempered glass pane 2, 3; and
implanting a plurality of ions into at least a portion of the first surface to form a strengthened portion, wherein the strengthened portion comprises a plurality of nitrogen ions, carbon ions, argon ions, or a combination comprising at least one of the foregoing.

43. A method for producing a vacuum insulated glazing unit 1, the method comprising:
implanting a plurality of ions into at least a portion of a first surface of a first glass pane 2 to form a strengthened portion; and
combining the first glass pane 2, a second glass pane 3, a plurality of spacers 4, and a side seal material 9 to produce the vacuum insulated glazing unit 1.

44. The method of item 43, wherein the vacuum insulated glazing unit 1 comprises:
the first glass pane 2 and the second glass pane 3 arranged in parallel, the second glass pane 3 spaced apart from the first glass pane 2, wherein each glass pane 2, 3 comprises an inner surface 16, 18 and an outer surface 6, 8, wherein the inner surface of the first glass pane 16 and the inner surface of the second glass pane 18 define a gap 7 therebetween;
the plurality of spacers 4 arranged in the gap 7 between of the inner surface of the first glass pane 16 and the inner surface of the second glass pane 18; and
the side seal material 9 attached around a periphery of the first glass pane 2 and the second glass pane 3, thereby forming a sealed cavity between the glass panes 2, 3,
wherein the inner surface of the first glass pane 16 is the first surface of the first glass pane 2.

45. The method of item 44, further comprising reducing the pressure in the sealed cavity.

46. The method of any of items 43 to 45, wherein the strengthened portion comprises a plurality of nitrogen ions, carbon ions, argon ions, or a combination comprising at least one of the foregoing.

47. The method of any of items 43 to 46, further comprising implanting a plurality of ions into at least a portion of a first surface of the second glass pane 3 to form a strengthened portion prior to the step of combining, wherein the inner surface of the second glass pane 18 is the first surface of the second glass pane 3.

48. The method of any of items 43 to 47, further comprising thermally tempering at least one of the glass panes 2, 3 prior to the step of implanting.

49. The method of any of items 43 to 48, further comprising forming a low emittance coating on the inner surface 16, 18 of at least one of the glass panes 2, 3 prior to the step of implanting.

50. The method of any of items 43 to 49, further comprising forming a low emittance coating on the inner surface 16, 18 of at least one of the glass panes 2, 3 after the step of implanting.

51. A window comprising the vacuum insulated glazing unit 1 according to any of items 1 to 36, the glass pane 2, 3 of according to any of items 37-40, or prepared by the method according to any of items 41 to 50.

52. Use of the vacuum insulated glazing unit 1 according to any of items 1 to 36 for a window.

53. Use of the glass pane 2, 3 according to any of items 37 to 40 for a vacuum insulated glazing unit 1.

54. Use of the vacuum insulated glazing unit 1 prepared by the method according to any of items 41 to 50 for a window.

55. Use of the window of item 51 for a fixed or ventilating window of a commercial building.

56. Use of the window of item 51 for a fixed or ventilating window of a residential building.

57. Use of the window of item 51 for a roof window or a skylight window.

58. Use of the window of item 51 for a vertical window application.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A vacuum insulated glazing unit comprising:
a first glass pane and a second glass pane arranged in parallel, the second glass pane spaced apart from the first glass pane, wherein each glass pane comprises an inner surface and an outer surface, wherein the inner surface of the first glass pane and the inner surface of the second glass pane define a gap therebetween;
a plurality of spacers arranged in the gap between of the inner surface of the first glass pane and the inner surface of the second glass pane; and
a side seal material attached around a periphery of the first glass pane and the second glass pane, thereby forming a sealed cavity between the glass panes,
wherein at least a portion of the inner surface of the first glass pane comprises a strengthened portion that comprises a plurality of implanted ions, wherein the plurality of implanted ions comprises nitrogen ions, carbon ions, argon ions, or a combination comprising at least one of the foregoing,
wherein the inner surface of at least one of the first glass pane and the second glass pane comprises a plurality of strengthened portions, and
wherein the plurality of strengthened portions are separated by one or more non-strengthened portions that do not have implanted ions.

2. The vacuum insulated glazing unit of claim 1, wherein the plurality of implanted ions comprises at least two different ions.

3. The vacuum insulated glazing unit according to claim 1, wherein the plurality of implanted ions are a combination of nitrogen ions and argon ions.

4. The vacuum insulated glazing unit according to claim 1, wherein the plurality of implanted ions are a combination of argon ions and carbon ions.

5. The vacuum insulated glazing unit according to claim 1, wherein the plurality of implanted ions are a combination of carbon ions and nitrogen ions.

6. The vacuum insulated glazing unit according to claim 1, wherein the plurality of implanted ions have an implant depth of 5 to 50 nanometers.

7. The vacuum insulated glazing unit according to claim 1, wherein at least a portion of the inner surface of the second glass pane comprises a strengthened portion that comprises a plurality of implanted ions, wherein the plurality of implanted ions are nitrogen ions, carbon ions, argon ions, or a combination comprising at least one of the foregoing.

8. The vacuum insulated glazing unit according to claim 1, wherein the inner surface of the first glass pane comprises a plurality of spacer contact regions, wherein each spacer contact region comprises a portion of the plurality of implanted ions and is in contact with at least one spacer of the plurality of spacers.

9. The vacuum insulated glazing unit according to claim 1, wherein at least one of the first glass pane and the second glass pane is a tempered glass pane, wherein the tempered glass pane has been tempered by thermal tempering, chemical tempering, plasma tempering, or a combination comprising at least one of the foregoing.

10. The vacuum insulated glazing unit according to claim 9, wherein the first glass pane and the second glass pane are tempered glass panes, wherein the tempered glass panes have been tempered by thermal tempering.

11. A window comprising the vacuum insulated glazing unit of claim 1.

* * * * *